Nov. 14, 1967
J. H. SPENCER
3,353,142
AUXILIARY TERMINAL FOR METER SOCKETS
Filed April 8, 1965
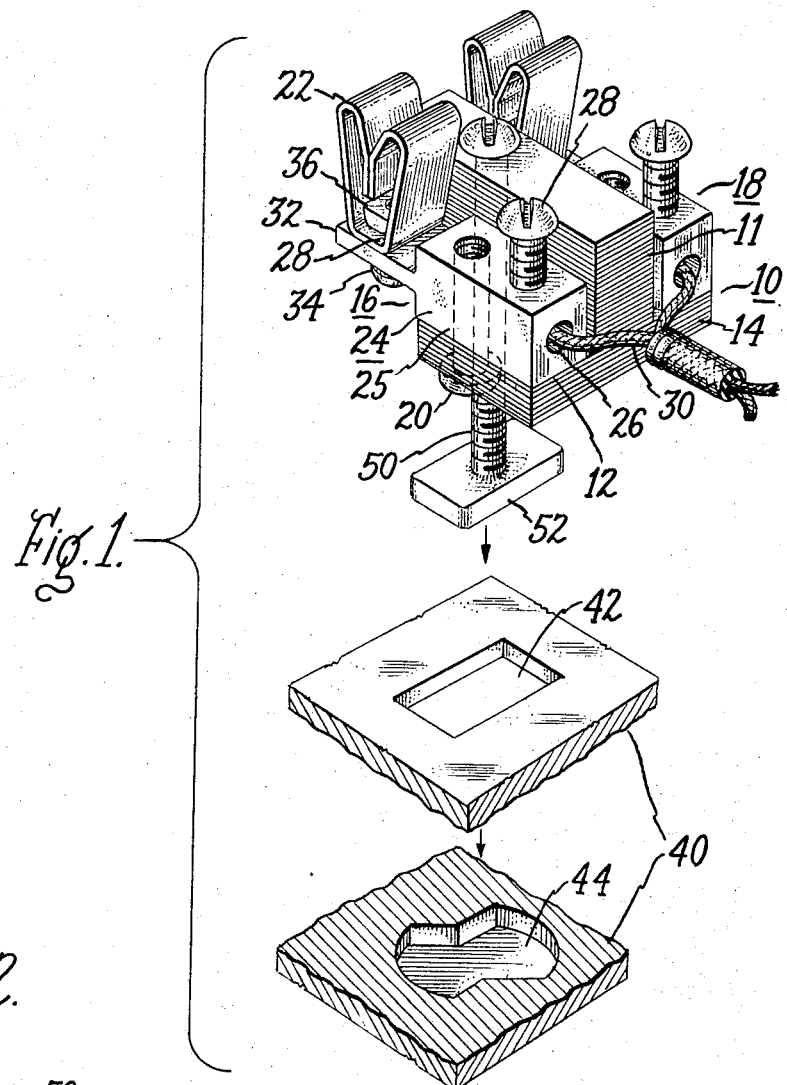
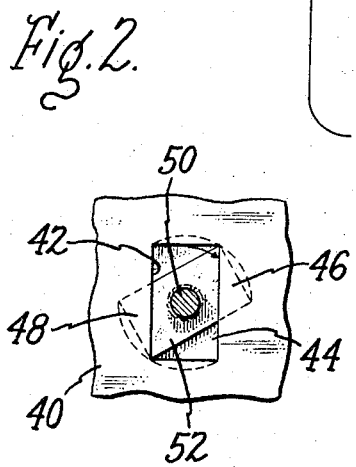
Inventor,
John H. Spencer,
by Francis K. Doyle
His Attorney.

United States Patent Office 3,353,142
Patented Nov. 14, 1967

3,353,142
AUXILIARY TERMINAL FOR METER SOCKETS
John H. Spencer, Rochester, N.H., assignor to General Electric Company, a corporation of New York
Filed Apr. 8, 1965, Ser. No. 446,674
1 Claim. (Cl. 339—125)

ABSTRACT OF THE DISCLOSURE

An auxiliary terminal for meter sockets. An insulated block is provided having one or more shelves, to each of which is secured a connector assembly including a spring terminal jaw and a wire connector. The insulated block is secured to the insulated socket block of a meter socket by means of an elongated nut threaded on a screw member which extends through the insulated block. The elongated nut fits through an opening in the insulated socket block and into a cavity therein which allows the elongated nut to turn out of alignment with the opening but prevents rotation of the elongated nut.

---

This invention relates to meter sockets and more particularly to an auxiliary terminal for use in meter sockets.

As is well known to those skilled in the meter art, most meter sockets are provided with spaced terminals. These terminals are usually provided with spring jaws providing means for securing a metering device within the meter socket. The various types of metering devices used in such sockets are provided with spaced terminals in the form of blades which fit the spring jaws of the socket providing the desired electrical connections to the meter. As is well known, the various spring jaws of the socket are provided with wire connectors which are connected to the various sources of electricity and the various electrical loads. Further, it is well known that many types of meters are provided with five or more terminals, depending upon the type of meter and the various quantities which the meter is utilized for measuring. In such instances a five or more terminal meter socket is required. In many instances it is desired to change an installation from a four terminal socket to one with five or more terminals for accepting a different type meter such as, for example, when changing the electrical service from single phase to network. There are also many other applications in electric metering where auxiliary terminals are required. In many instances these terminals do not carry the circuit voltage or current of the meter for metering purposes. Examples of these are leads for contact making devices used in some types of demand metering and terminals for use with switches contained in some meters for controlling electric water heaters on off peak periods and the like.

In many instances where it has been found desirable to change a meter installation from a four terminal meter socket to five or more terminal socket it has generally been necessary to install a new meter socket. These new meter sockets, of course, are provided with the desired amount of terminal jaws for mounting the new type of meter therein. As will be understood by those skilled in this art, when it is desired to replace a meter having four terminals for a meter having five or more terminals it is very costly and time consuming if it is also required to install a new meter socket and make all new electrical connections and the like.

To obviate the necessity of new meter sockets, some sockets have been provided with means for mounting a fifth or sixth terminal therein. In these sockets a space is generally provided in the meter socket terminal block and the fifth or sixth terminal may be mounted in such space. In many instances the additional terminal is held in place by screws or bolts. One example of this type terminal to be added to a meter socket may be found in Patent No. 2,695,923. It will be readily understood that in mounting the additional terminal in such a manner it is necessary to remove the screws holding the terminal block to the socket. As will be understood, where removal of the terminal block is required, it is necessary to de-energize the circuit prior to removal of the terminal block. Working with a live terminal block can lead to dangerous conditions to the installer or repairman, as well as problems of property damage should one of the energized terminals of such terminal block come in contact with other metallic material. Of course, as is understood, in de-energizing a meter socket much labor and care is required, thus making use of these types of additional terminals almost as expensive in labor and time as the installation of a new meter socket.

In many types of metering such as, for example, in demand metering, it has been found desirable to provide an auxiliary terminal for use in a meter socket such that meter sockets may be readily modified to accept meters having additional terminals. It has been found extremely desirable to provide for rapid and inexpensive attachment of the additional socket terminals in such installations. Thus it is apparent that there is a need in the metering field for socket terminals which may be readily attached to a meter socket without the necessity of removing any of the parts of the socket already mounted. Of course, it is also clear that it is very desirable that the new type auxiliary terminal be one which can be simply connected to the meter socket with safety without endangering the repairman or without danger to any personal property.

It is therefore an object of this invention to provide a novel auxiliary terminal for a meter socket.

It is a further object of this invention to provide a meter socket with a socket terminal block whereby an additional, novel auxiliary terminal may be readily added to the terminal block safely and inexpensively.

A further object of this invention is to provide a novel auxiliary terminal for use in meter sockets which may be readily attached to such socket without the necessity of removing any portions of the socket.

A still further object of this invention is to provide a novel auxiliary terminal for a meter socket which is relatively inexpensive to manufacture and which may be safely applied to the meter socket either in the field or in the utility storeroom.

In carrying out this invention in one form, an auxiliary terminal is provided comprising an insulated base portion having at least one connector assembly secured thereto. The connector assembly comprises a terminal jaw member and a wire connector electrically connected together. Means are provided on the insulated base for cooperating with the socket terminal block of a meter socket to firmly secure the auxiliary terminal to the socket terminal block without the removal of any parts of such meter socket.

The invention which is desired to be protected will be specifically pointed out and distinctly claimed in the claims appended hereto. However, it is believed that the invention and the manner in which its various objects and advantages are obtained, as well as other objects and advantages thereof, will be more readily understood by reference to the following detailed description of a preferred embodiment thereof, particularly when taken in connection with the accompanying drawing, in which:

FIGURE 1 is an exploded perspective view of one form of the novel auxiliary terminal of this invention showing a preferred means of attaching such auxiliary terminal to the meter socket; and FIGURE 2 is a top view of a portion of a socket terminal block showing a cavity similar to FIG. 1 with the preferred securing means therein.

Reference will now be made to the drawing in which like numerals are used to indicate like parts throughout the various views thereof. In the drawing, a preferred form of auxiliary terminal is shown according to this invention, in conjunction with a portion of a socket terminal block of a meter socket. As there shown, the auxiliary terminal comprises an insulation block having a connector assembly secured thereto. The auxiliary terminal is provided with a securing means for allowing the auxiliary terminal to be readily secured to a socket without removal of any parts of such socket.

Referring now specifically to FIG. 1, an auxiliary terminal is shown in its preferred form as a terminal 10 comprising an insulated block 11 provided with shelf portions 12 and 14. Mounted on each shelf portion is a connector assembly 16 and 18, respectively. Of course, it will be understood that, if desired, only one connector assembly and one shelf portion need be provided in those installations where only a single additional terminal is desired.

The connector assemblies are secured to the shelf members in any desired manner such as, for example, by the screw member 20 which is shown attaching connector assembly 16 to shelf 12. Each connector assembly comprises a spring terminal jaw and a wire connecting means which is electrically connected to the terminal jaw. As shown in FIG. 1, the connector assembly 16 is provided with a spring terminal jaw such as 22 and a wire connector 24. The wire connector 24 is formed of a copper block 25 having an opening 26 drilled therein. A screw member 28 is threaded into a threaded opening, as shown, to secure a wire member such as, for example, wire 30 in the opening 26. Of course, it will be understood that other types of wire connectors may be provided, the type of wire connector depending principally on the size and type of wire to be used and the current and voltage requirements of a particular application.

As will be understood the terminal jaw is electrically connected to the wire connector means. In the embodiment shown, the block 25 of wire connector 24 has an extension 32 and the terminal jaw 22 is firmly attached thereto such as, for example, by bolt member 34 and nut 36.

The auxiliary terminal 10 is secured to the insulated socket block of the meter socket. In the preferred embodiment shown, the auxiliary terminal is connected to a cavity in the insulated block. FIGURE 1 and FIGURE 2 show a portion of the insulated socket block of the meter socket. In FIG. 1 the insulated block is shown as two parts to better disclose the construction of the cavity therein. As is there shown, the insulated block 40 is provided with rectangular opening 42 on its upper surface. The cavity 44 within block 40 may be of any desired shape, one particular shape being shown in FIG. 1. As can be seen, with such shaped cavity 44 the upper surface of block 40 forms shelf portions 46, 48 as particularly shown in FIG. 2.

The auxiliary terminal 10 is provided with attaching means in the form of an elongated bolt 50 which extends through the thickness of block 11 and is provided with an elongated, shaped nut, such as rectangular nut 52. As will be apparent from the drawing, the rectangular nut 52 extends through the rectangular opening 42 on the surface of insulated block 40 and into the cavity 44. Of course, as will be understood, the shape of opening 42 will conform to the elongated shape of the nut 52. As bolt 50 is rotated the nut 52 will turn against the sides of cavity 44 as indicated more clearly in FIG. 2. As will be apparent the sides of cavity 44 will prevent further rotation of nut 52 thus allowing bolt 50 to be threaded on to the nut 52. As bolt 50 is threaded on nut 52 it will clamp the auxiliary terminal 10 to insulated block 40. As will be apparent from the drawing, the nut 52 will be drawn tightly against the shelf portions 46 and 48 as bolt 50 is tightened on to the nut 52. In this manner the auxiliary terminal 10 will be firmly secured to the insulated socket block of a meter socket providing the desired additional terminal or terminals.

As will be apparent from the above description, the auxiliary terminal of this invention may be readily installed in any terminal block having a cavity such as cavity 44 indicated in the drawing. Obviously, the installation can be readily accomplished in the field or at the utility storeroom. It will be apparent that the auxiliary socket of this invention provides a simply installed, auxiliary terminal which may be readily utilized with a corresponding oriented blade terminal of a metering device. Clearly, the auxiliary terminal may be quickly attached to the meter socket and the electrical connections made to the connector assembly as desired. The meter, of course, may be installed or removed from the socket including the auxiliary terminal without the necessity of connecting or disconnecting any wires. Obviously, as will be apparent, all wire connections may be made in the socket prior to the installation of the meter.

While there has been shown and described the present preferred embodiment of the auxiliary terminal of this invention it will be readily apparent to those skilled in the art that various changes may be made in the construction of the auxiliary terminal without departing from the spirit and scope of the invention as is set forth in the appended claim.

What is claimed as new and which it is desired to secure by Letters Patent of the United States is:

An auxiliary terminal for securing to the socket terminal block of a meter socket comprising, in combination, an insulated base portion, at least one connector assembly secured to said insulated base portion, said connector assembly comprising a terminal jaw and a wire connector electrically connected together, and securing means attached to said insulated base portion for securing said auxiliary terminal to said socket terminal block, said securing means being in the form of an elongated nut threaded to a bolt which extends from said insulated base portion, and said socket terminal block having an elongated opening through which said nut extends, with a cavity beneath said elongated opening forming shelf portions therewith, said cavity allowing said nut to turn out of alignment with said elongated opening but preventing rotation of said elongated nut.

References Cited

UNITED STATES PATENTS

| | | | |
|---|---|---|---|
| 1,267,457 | 5/1918 | Sachs | 339—219 |
| 1,488,669 | 4/1924 | Getchell | 174—52 |
| 2,538,912 | 1/1951 | Road et al. | 339—31 |
| 2,598,521 | 5/1952 | Espenschied | 339—31 |
| 2,695,923 | 11/1954 | La Jeunesse et al. | 174—52 |

FOREIGN PATENTS

| | | |
|---|---|---|
| 885,319 | 12/1961 | Great Britain. |
| 962,312 | 7/1964 | Great Britain. |

MARVIN A. CHAMPION, *Primary Examiner.*

J. H. McGLYNN, *Assistant Examiner.*